Oct. 20, 1959  R. F. JEFFREYS, JR  2,909,196
FLOW RESTRICTOR
Filed Oct. 11, 1956

INVENTOR.
ROBERT F. JEFFREYS, Jr.
BY
ATTORNEYS

2,909,196
FLOW RESTRICTOR

Robert F. Jeffreys, Jr., Gladwyne, Pa.

Application October 11, 1956, Serial No. 615,254

2 Claims. (Cl. 138—44)

This invention relates to a flow restrictor for use, for example, in a fluid system and to a method of making a flow restrictor.

The broad object of this invention is to provide a synthetic resin flow restrictor.

A further object is to provide a flow restrictor which can be flexed without substantial alteration of its flow characteristics.

These and other objects of this invention will become apparent on reading the description in conjunction with the following drawings in which.

Figure 1:
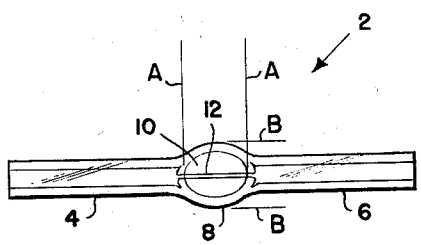
Figure 1 is a plan view of a flow restrictor in accordance with this invention.

Referring to Figure 1, a flow restrictor 2, in accordance with this invention has a tubular portion 4 and a tubular portion 6. Tubular portions 4 and 6 are joined by a substantially flattened portion 8 having opposed substantially flat faces 10, 10. Flattened portion 8 has a passageway 12 circular in cross section and substantially coaxial with tubular portions 4 and 6. Passageway 12 has a reduced diameter in cross section to provide the desired restriction of flow.

Restrictor 2 may be formed of any flexible thermoplastic resin which either has inherently the desired flexibility or contains a plasticizer to provide the desired flexibility. Exemplary of suitable thermoplastic resins are polyethylene, polyvinylidene chloride, polyacrylonitrile, styrene-butadiene or polyvinyl chloride. Long chain synthetic polymeric amides are also satisfactory. Nylons which are polymers formed from a dibasic acid such as adipic, sebacic or azelaic acid and a diamine such as hexamethylene diamine or tetramethylene diamine, preferably in about a one to one mole ratio are exemplary. By way of further example, copolymers of polyacrylonitrile and vinyl acetate, vinyl pyridine or pyrrolidine are satisfactory. It is preferred to use polyethylene of a molecular weight in the range of from about 25,000 to about 35,000.

The tubular portions 4 and 6 may be of any desired length although the flattened portion 8 will conveniently be located relatively close to the end of the restrictor where the total length of the restrictor is relatively long. The inner diameter of the tubular portions may vary widely but normally will be within the range of from about $\frac{1}{32}''$ to about $\frac{1}{2}''$. The wall thickness of the tubular portions will preferably be a minimum of $\frac{1}{64}''$ and normally will not exceed $\frac{1}{2}''$. Advantageously the wall thickness of the tubular portions will be from about 50% to about 100% of the inner diameter.

The length of the flattened portion 8, that is, the distance between the inner ends of the tubular portions indicated between the lines A—A in Figure 1, will preferably not be less than ⅔ the outer diameter of the tubular portions. Similarly, the width of the flattened portion 8, indicated by the lines B—B in Figure 1, will not be less than the outer diameter of the tubular portions. The distance between the faces 10 of flat portion 8 will be at least twice the diameter of the restricted passageway and will not exceed the outer diameter of the tubular portions.

Figure 2:
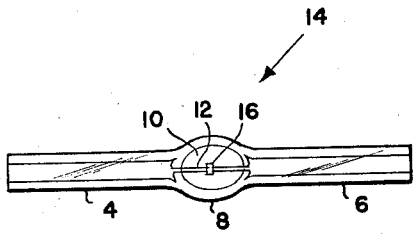
Figure 2 is a plan view of a modified flow restrictor.

A restrictor 14 substantially identical with restrictor 2 is shown in Figure 2. Restrictor 14 differs from restrictor 2 only in that it is provided with a colored synthetic resin insert 16 for coding purposes.

Figure 3:
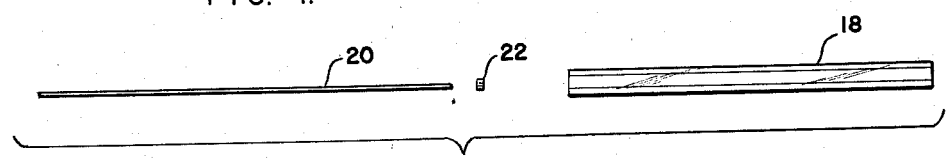
Figure 3 is an exploded view of the materials used to form the restrictor of Figure 2.
Figure 4:
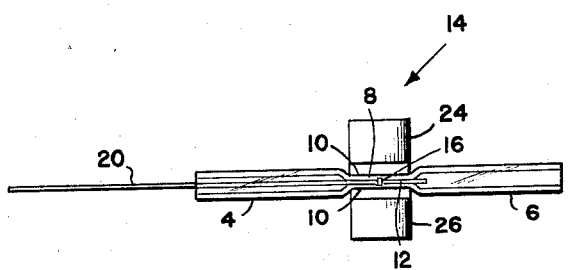
Figure 4 is a side elevation of the restrictor of Figure 2 after the application of heat and pressure.

The method of forming restrictors in accordance with this invention and, more specifically, of forming either restrictor 2 or restrictor 14 is specifically illustrated in Figures 3 and 4 with respect to restrictor 14. As shown in Figure 3, restrictor 14 can be formed from a thermoplastic resin tube by employing a mandrel 20 and a colored ring 22 of any flexible thermoplastic resin. Where ring 22 is employed, tube 18 will be formed of a transparent or sufficiently translucent resin to permit the viewing of ring 22.

Where, as in Figure 3, ring 22 is employed, it is placed over the mandrel and then the ring and mandrel assembly is inserted within tube 18 as best seen in Figure 4. The diameter of the mandrel determines the diameter of the restricted passageway 12 and is selected accordingly. After the insertion of the mandrel 20, tube 18 is heated in the area to be flattened until the resin becomes plastic. The tube is then flattened in the desired area through the use of, for example, jaws 24 and 26 which may be, for example, the jaws of a pair of pliers. The action of jaws 24 and 26 causes the resin of tube 18 to be forced against mandrel 20 so as to form the passageway 12 having a substantially uniform inner diameter equal to the outer diameter of mandrel 20. The thus formed restrictor is then cooled until in the solid state and then the jaws 24 and 26 are opened. The method is completed by withdrawing the mandrel. The completed restrictor is shown in Figure 5.

Figure 5:
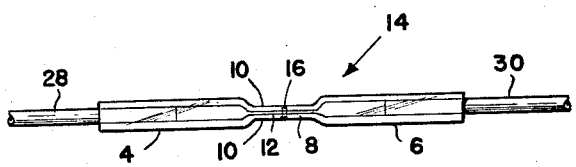
Figure 5 is a side elevation partially broken away of the flow restrictor of Figure 2 secured to pipes in a fluid system.

As shown in Figure 5, the completed restrictor 14 may be placed, for example, in a pneumatic system by telescoping the outer ends of tube portions 4 and 6 over the ends of metal pipes 28 and 30 having an outer diameter slightly larger than the inner diameter of the restrictor tubular portions.

Figure 6:
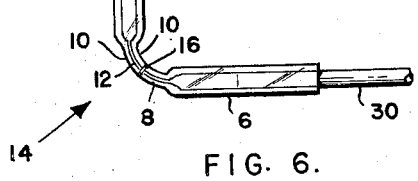
Figure 6 is a side elevation of the flow restrictor of Figure 2 in a flexed position.

As illustrated in Figure 6, the restrictor 14 is particularly advantageous in that it can be flexed into any desired position, for example, at right angles, as illustrated, without substantially modifying the transverse cross section of the passageway 12. Similarly, any torsional action on the tubular portions 4 and 6 will not substantially modify the cross section of the passageway 12.

It is not desired to be limited except as set forth in the following claims.

What is claimed is:

1. A flow restrictor formed of flexible thermoplastic synthetic resin and having a pair of tubular portions and a flat portion connecting said tubular portions, said flat portion having a passageway connecting the interiors of said tubular portions, said flat portion having a thickness not in excess of the outer diameter of the tubular portions and a width not less than the outer diameter of the tubular portions and said passageway having a cross-sectional area substantially less than the cross-sectional area of the interior of either of the tubular portions, flexing of said flat portion having substantially no effect on the cross-sectional area of the passageway in said flat portion whereby flow restriction is not substantially varied when the flat portion is flexed.

2. A flow restrictor formed of flexible thermoplastic synthetic resin and having a pair of tubular portions and a flat portion connecting said tubular portions, said flat portion having a passageway connecting the interiors of said tubular portions, said flat portion having a thickness not in excess of the outer diameter of the tubular portions and not less than double the diameter of the passageway and having a width not less than the outer diameter of the tubular portions and said passageway having a cross-sectional area substantially less than the cross-sectional area of the interior of either of the tubular portions, flexing of said flat portion having substantially no effect on the cross-sectional area of the passageway in said flat portion whereby flow restriction is not substantially varied when the flat portion is flexed.

References Cited in the file of this patent

UNITED STATES PATENTS

| | | |
|---|---|---|
| 1,583,464 | Houskeeper | May 4, 1926 |
| 1,884,131 | Neidich | Oct. 25, 1932 |
| 2,261,028 | Hopkins | Oct. 28, 1941 |
| 2,324,237 | Reichel | July 13, 1943 |
| 2,331,324 | Jakosky | Oct. 12, 1943 |
| 2,347,101 | Harding | Apr. 18, 1944 |
| 2,389,038 | German | Nov. 13, 1945 |
| 2,407,050 | Allen et al. | Sept. 3, 1946 |
| 2,501,593 | Becker | Mar. 21, 1950 |
| 2,593,420 | Diehl | Apr. 22, 1952 |
| 2,735,230 | Morrill | Feb. 21, 1956 |
| 2,752,951 | Silverstein | July 3, 1956 |
| 2,791,239 | Mason | May 7, 1957 |

UNITED STATES PATENT OFFICE

CERTIFICATE OF CORRECTION

Patent No. 2,909,196                     October 20, 1959

Robert F. Jefferys, Jr.

It is hereby certified that error appears in the above numbered patent requiring correction and that the said Letters Patent should read as corrected below.

In the grant, lines 1 and 12, and in the heading to the printed specifications, line 3, name of patentee, for "Robert F. Jeffreys, Jr.,", each occurrence, read -- Robert F. Jefferys, Jr., --.

Signed and sealed this 19th day of April 1960.

(SEAL)
Attest:
KARL H. AXLINE
Attesting Officer

ROBERT C. WATSON
Commissioner of Patents